Nov. 18, 1958     H. J. ASBECK ET AL     2,861,011
COATED BUILDING BLOCKS AND METHOD OF PRODUCING SAME
Filed Dec. 11, 1953
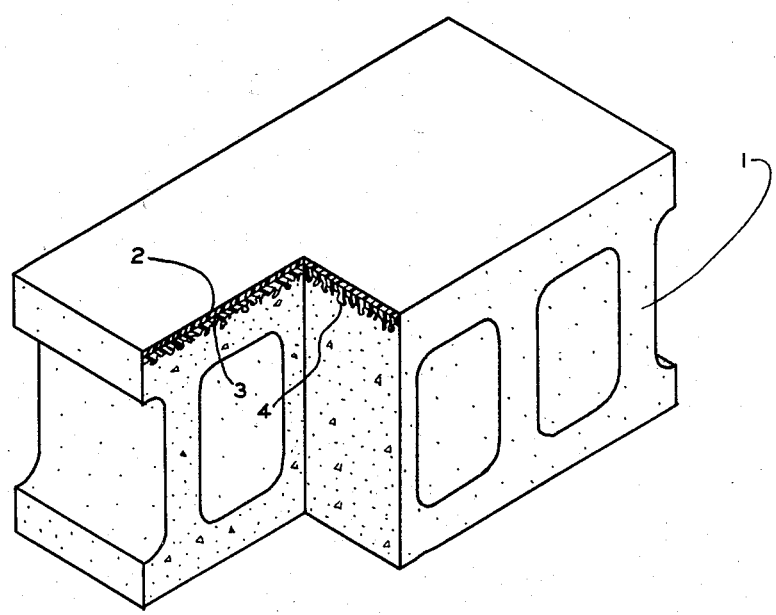
LLOYD J. JORDON
HANS J. ASBECK
           *INVENTORS*
BY
*Robert A. Sturges*
    *ATTORNEY*

# 2,861,011
// Patented Nov. 18, 1958

2,861,011

COATED BUILDING BLOCKS AND METHOD OF PRODUCING SAME

Hans J. Asbeck, Lakewood, and Lloyd J. Jordan, Eastlake, Ohio, assignors to The Sherwin-Williams Company, Cleveland, Ohio, a corporation of Ohio Application December 11, 1953, Serial No. 397,666

3 Claims. (Cl. 117—72)

This invention relates, as indicated, to a decoratively finished building material and more particularly to a decoratively coated porous, cementitious or siliceous building block and a method for producing the same.

While there are many obvious advantages to cementitious and siliceous building units, they have a serious drawback in that they are not usually considered as finished surface materials, particularly with respect to interior surfaces, and it has become the customary practice to overlay interior surfaces and in some cases exterior surfaces with a finish surface of some kind, for example, plaster. In effort to minimize the cost of surfacing, early procedures directed at producing an acceptable interior surface, for example, called for the direct application of paint to wall surfaces constructed of porous building units such as bricks and the various concrete or cinder blocks. The application of paint resulted, of course, in a textured surface which was not always desired. Furthermore, unless the paint is especially formulated to withstand the normally strongly alkaline surface of these building units, in a relatively short time the paint film would disintegrate. Much effort has recently been expended in the development of special paints adapted to withstand the alkaline character of certain building units and provide a surface reasonably acceptable as an interior or exterior finish. With the ordinary paint into which there has been built some degree of alkali resistance, it has been found that with an ordinary concrete block, at least six to eight coats of paint are required before satisfactory coverage is achieved because of the powerful adsorptive characteristics of these blocks. Even in this case, the result is not fully satisfactory because of "bridging" which may destroy an otherwise attractive "textured" finish.

Excepting in those cases where a "textured" surface or an untreated block surface is adequate, it is the usual practice to utilize these building materials for inner wall construction over which there is superimposed a finish surface such as plaster, wood, tile, and the like. Some of the need for a building unit providing in one piece the structural advantages of concrete block, for example, and a finished interior and/or exterior surface has been supplied by manufacturers of glazed tile, which practice has even more recently been attempted to provide a glazed surface on concrete block. While glazed tile is quite satisfactory from a performance standpoint, there is a limit to the size of tile which can be made without distortion due to the high heat involved in the glazing operation. The cost of the product in the wall is therefore high. It is difficult to produce a unit which can serve both as a structural supporting member and a finish surface by a glazing operation. Attempts to translate the glazing procedure to the concrete block field, particularly where the surface area is greater than that provided by a 4 x 8 block have enjoyed only limited success because the temperatures involved in the glazing operation effect a structural change in the concrete block which has a tendency to weaken it. Moreover, it is difficult to impart color to the glazed compositions because of the instability of the pigments at the higher temperatures. A glazed surface is, of course, hard but very brittle. Hence the mar-resistance of a glazed surface is excellent, but it shatters easily under impact.

It is a principal object of the present invention, therefore, to provide a building unit which not only serves as a structural member but also provides a finished surface, thereby avoiding the necessity of further labor for making an acceptable interior and/or exterior surface.

Another object of this invention is to provide a building unit composed of a porous structural member having anchored thereto a decorative surface which is substantially smooth, hard, abrasion and mar resistant, and flexible.

Another object of this invention is to provide a method for constructing a building unit functioning both as a structural unit and as an interior and/or exterior finish.

Other objects of this invention will appear as the description proceeds.

To the accomplishment of the foregoing and related ends, said invention, then, consists of the means hereinafter fully described and particularly pointed out in the appended claims, the following description and the annexed drawing setting forth in detail certain illustrative embodiments in the invention, such disclosed means constituting, however, but a few of the various forms in which the principle of this invention may be employed.

Broadly stated, therefore, this invention comprises a structural unit comprising a formed porous physically solid building block, the pores of at least one face of which have been substantially filled with a composition containing a chemically hardenable polyglycidyl polyether of a polyhydric phenol to yield a substantially smooth surface, and a separately applied coating superimposed thereover containing a similar chemically hardenable polyglycidyl polyether of a polyhydric phenol.

In the annexed drawing there is shown a fragmentary isometric view of a cementitious block 1 having the top surface plural coated with a filter coat 3 and a top coat 2. Pores 4 are shown being substantially filled with the filler. While the coatings are shown as separate layers for convenience in illustrating the plural coat feature of this invention, it will be understood, however, that although the coatings are applied as separate layers, there is a fusion of the coatings particularly where the filler coat is not allowed to dry prior to application of the next coat.

The manufacture of these building units is not a mere single coating operation. It has been found that at least two coats are required in order to achieve the desired effect of a quite smooth surface free of pin-holes, craters, pitting, bridging, etc. effects. The success of the building unit as a decorative serviceable unit depends to a large extent upon the substantial filling of the pores in the surface of the block being coated.

Substantial filling of the pores may be achieved by mechanically working the filler coat into the pores by means of squeegees and vibrators as more particularly pointed out in copending application Ser. No. 438,472, filed June 22, 1954, by Hans J. Asbeck and Noel D. Harter, now Patent 2,804,044.

Any suitable means for scraping and pounding the viscous filler admixture into the pores to yield a substantially smooth surface for the second coating operation may be used, however, without departing from the scope of this invention.

Mere application of a single coat over a porous substrate is not satisfactory when using the chemically hardening polyglycidyl polyethers of polyhydric phenols as the resinous vehicle. On curing with aliphatic polyamines, or other chemical hardening agents, heat is generated by the reaction causing the air in the pores to expand. Where a pore has but one opening, the entrapped expanding air can be released only through the film of the applied coating. This causes pin-holes and blisters and impairs the appearance of the product. Hence, it is necessary to substantially replace the air in such pockets by mechanically working the filler coat into the pores so that this tendency is minimized insofar as is possible.

It is also desirable that the filler coat have a fairly high viscosity, i. e., about the consistency of a thick motor oil (SAE 50), so that it will resist absorption into the block through those cells which have more than one opening. The power of concrete blocks and bricks to absorb liquids is very great and a viscosity sufficient to minimize this effect at least until an initial set has occurred is important from the standpoint of cost of material and obtaining a fairly smooth surface to receive the final coat. For most purposes, the viscosity of the filler coat should be from about R to $Z_5$ (Gardner) or 120 to 175 sec. at 75° F. on the #2 Sherwin-Williams Cup. Of course, the "tighter" the face being filled, the lower the viscosity that is required to produce a satisfactory face.

While it is clear that the minimum two coats may be of the same composition without altering the effectiveness of the product whatsoever, nevertheless, for reasons of economy a less expensive filler coat is conveniently used as the first coat to be later overlayed with a finish coat which carries a desired pigmentary material for hiding and/or color. The resinous vehicles in either coat are generally the same or similar materials hardenable by chemical action with a catalyst admixed with the resin just prior to application to the block.

In applying such epoxy ether type resins, it has been found most satisfactory to use spray application methods. The chemical hardening agents cannot be readily previously admixed with the resin-containing coating compositions since their activity as hardening agents has not yet been sufficiently inhibited during storage. The "pot life" is, therefore, limited to from 15 minutes up to 8 or more hours depending upon the activity of the catalyst. Pre-mixing of the catalyst and resin, therefore, necessitates care in periodically cleaning the apparatus to insure that catalyzed material is removed before it can set-up. Once the resinous material has set-up in the conduits and equipment of the apparatus used in applying the material, such parts may as well be scrapped as the hardened resin is essentially inert to solvents.

The spray application method utilizing a specially adapted spray gun, such as the one shown and described in application Ser. No. 323,318, filed November 29, 1952, now Patent No. 2,780,496, by Asbeck and Ehrett, enables the catalyst and resin to be maintained separate throughout the application equipment becoming admixed exterior of the spray gun as fine mists in a turbulent air stream. The reactants are thus mixed in metered proportions (1% to 10% catalyst by weight of the resin) just prior to impingement on the surface of the block. In this way clean-up of the equipment and changing of colors is greatly facilitated, and all problems of resin setting up within the equipment are avoided.

As indicated above, precisely the same composition may be used for both the filler coat and the finish coat if desired, but two separate coats are applied to allow for working of the filler coat into the pores and the application of a final coat which is not worked.

Coating compositions which have been found satisfactory in producing the articles of this invention are composed principally of an ether resin of the type which contains intact epoxy groups in the molecule and cures by addition thereto of from 1% to 10% by weight of the resin of a polyamine, such as ethylene diamine or the like. Pigments are also included together with a small amount of solvent, e. g., an aromatic hydrocarbon solvent such as xylene, toluene, or benzene. Minor amounts of other liquid components which improve in certain respects the character of the final film may also be incorporated. It becomes convenient to illustrate a mode of formulating and compounding coating compositions useful herewith. These examples are to be understood as illustrative of satisfactory coating compositions only and not limitative of the invention which, as indicated above, is in the novel building unit and the method of making it.

*Example I*

| | Lbs. |
|---|---|
| Titanium dioxide (rutile) | 250 |
| Cadmium red (CdS+CdSe on $BaSO_4$) | 4 |
| Colloidal clay (bentonite) | 46 |
| Polyglycidyl polyether of a polyhydric phenol | 615 |
| Xylene | 187 |
| Paraffin wax (5% solution in xylene) | 36 |

The pigments, about one-third of the resin, and about one-half of the solvent were milled together on a roller mill and ground to a Hegman 7H grind. The balance of the resin, solvent, and modifier were then added to complete the composition. This product weighed 10.95 pounds per gallon, and had a viscosity in the range of 37–42 sec. at 75° F. on the #2 Sherwin-Williams Cup.

*Example II*

| | Lbs. |
|---|---|
| Titanium dioxide (rutile) | 200 |
| Copper phthalocyanine green | 0.25 |
| Yellow iron oxide | 0.5 |
| Colloidal clay | 90 |
| Polyglycidyl polyether of a polyhydric phenol | 615 |
| Xylene | 190 |
| Paraffin wax (5% solution in xylene) | 36 |

The procedure for formulating was as in Example I and yielded a product of like characteristics but of a blue color.

*Example III*

| | Lbs. |
|---|---|
| Titanium dioxide (rutile) | 125 |
| Chromium oxide | 100 |
| Yellow iron oxide | 3 |
| Copper phthalocyanine blue | 2 |
| Colloidal clay | 71 |
| Polyglycidyl polyether of a polyhydric phenol | 615 |
| Xylene | 190 |
| Paraffin wax (5% in xylene) | 36 |

This composition, a deep turquoise color, weighed 11.1 lbs. per gal., and otherwise had the same properties as in the previous examples.

*Example IV.—Filler*

| | Lbs. |
|---|---|
| Precipitated calcium carbonate | 380 |
| Aluminum distearate | 5 |
| Polyglycidyl polyether of a polyhydric phenol | 590 |
| Xylene | 186 |

This material was produced in like manner as the previous examples and weighed 11.3 lbs. per gallon and had a much higher viscvosity than the finish coats, i. e., 130–150 secs. at 75° F. on the #2 Sherwin-Williams Cup.

Tinting colors dispersed in a resin-solvent mixture may be added to the foregoing or similar compositions to produce a whole range of colors. If the pigmented coating composition is to be used as a filler coat in spite of the economics question, the amount of aromatic hydrocarbon solvent specified in the examples should be reduced to raise the viscosity of the filler coat to from 120–175 secs. at 75° F., Sherwin-Williams #2 Cup.

In general, the filler admixture of polyamine and epoxy ether resin contains from about 1 to 10 parts of the organic polyamine per 100 parts of epoxy (or glycidyl) ether resin; about 600 parts of said epoxy ether resin, about 380 parts of an inert filler e. g., calcium carbonate, silica, clay, kaolin, magnesium silicate, etc., and about 190 parts of an aromatic hydrocarbon solvent for the resin. The second coating composition is basically the same except that the filler material is usually replaced with a lesser amount of a hiding pigment, such as, titanium dioxide (rutile or anatase), lithopone, leaded zinc oxide, etc., with or without added color imparting pigments. The amount of such hiding pigment is generally from about 125 parts to about 250 parts. Colloidal clay such as kaolin or bentonite may be added to the formula in amounts ranging from about 46 to about 90 parts by weight. Where it is desired to use a more viscous filler composition, a more highly polymerized epoxy ether resin may be employed or a lesser amount of solvent used. It is not essential that the viscosities of the plural coats be different, but in the case of concrete blocks, for example, which have relatively large depressions in the surface and are quite porous, it is recommended that the viscosity of the filler coat be greater than that of the final coat.

Practical experience has shown that it takes, in the case of the average 8″ x 16″ concrete block, from about 1 to about 1.5 ounces of filler to obtain satisfactory filling of the surface, and from about ¼ to about 1 ounce of the top coat to obtain satisfactory covering of the filled surface. These amounts will vary, of course, depending on the character of the block being coated. The cost of producing a structural unit in accordance herewith calculated on an average 8″ x 16″ concrete block is from 20 to 25 cents per face at current labor, material, and overhead costs.

The "blocks" which may be coated to produce the articles of this invention are any of the usual formed porous physically solid building units commonly available. The term "blocks" as used herein is intended to mean not only the familiar building blocks such as bricks, cement blocks, cinder blocks, and the like, of any shape or size, but also sheets of these materials. Blocks and sheets of lumber may also be treated in accordance herewith.

As indicated above, the essential film-forming ingredients of both the filler and the top or finish coating is a type of ether resin, preferably a polyglycidyl ether of a polyhydric phenol. These ethers are not self-curing and require a catalyst or setting agent which will react with the epoxy ether resin to form an insoluble, infusible resin. Certain catalysts react at elevated temperatures, e. g. 50° C. to 150° C., and others normally react at temperatures of from 18° C. to 50° C. Of course, the higher the temperature the faster the rate of reaction and, conversely, the lower the temperature the slower the reaction. It is possible, therefore, to select a curing agent which requires no heat to set the film and produce a product at room temperature, i. e., 20–25° C. A suitable curing agent for what may be classed as "air dry" films is ethylene diamine. Normally, about 5% by weight of the ether resin is a satisfactory amount of curing agent although more or less curing agent may be used; i. e., 1% to 10%. Higher concentrations, i. e., 7% to 10% have been found to produce an unusually decorative effect. At concentrations of 3% to 6%, the pigmented films are uniform, whereas at higher concentrations 7–10%, an attractive mottled effect caused by what is believed to be pigment flooding may be achieved.

Suitable epoxy ether resins are fully disclosed in the following patents: 2,528,932 to Wiles and Newey, dated Nov. 7, 1950, and 2,541,027 to Bradley, dated Feb. 13, 1951. Curing agents and conditions under which cures are effected are also clearly disclosed therein and no purpose will be served by reproducing herein the applicable disclosures of these and other patents relating to epoxy ether resins of the type referred to above. It will be understood, however, that the disclosures of the patents mentioned above are intended to be included by reference.

To state briefly, however, the mode of manufacture of polyglycidyl polyethers of polyhydric phenols, these materials are obtained by reacting at about 50° C. to 150° C. 1 to 2 mols of an epihalohydrin, e. g., epichlorohydrin with a mol of dihydric phenol, e. g., bis-(4-hydroxy phenyl)-dimethyl methane, in the presence of a base such as sodium, potassium, calcium or barium hydroxide in amount of about 10% to 30% stoichiometric excess of base to epihalohydrin, that is, 1.1 to 1.3 equivalents of base per mol of epihalohydrin. The reaction is effected in aqueous medium by first mixing together the water, dihydric phenol and the base, which mixture is then heated. The epichlorohydrin is added rapidly as a whole and heating is continued with agitation for several hours to convert the reactants to a taffy-like mass. While hot, the agitated reaction product is washed with water until substantially free of salt. Although the product is a complex mixture of polyglycidyl ethers, the principal product may be represented by the formula:

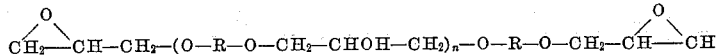

wherein R represents the divalent hydrocarbon radicle of a dihydric phenol and $n$ is of the series 0, 1, 2, 3, etc. The length of the chain can be made to vary by changing the molecular portions of epichlorohydrin to dihydric phenol. As hardening or curing agents organic polyamino compounds, such as, triethylamine, ethylene diamine, diethylamine, diethylenetriamine, triethylene-tetramine, melamine may be used.

One of the primary disadvantages of the combination of the polyglycidyl polyether of a polyhydric phenol and the curing agent is its "pot life." At reduced temperatures, i. e., 10–15° C. a pot life up to 6–8 hours can be achieved when ethylene diamine is the curing agent. At room temperature, the pot life falls rapidly to about 45 minutes and at slightly higher temperatures may be as low as 10–15 minutes. Satisfactory results may be obtained at or below room temperature, 70–80° F., although it is desirable to cool the reactants separately to about 50° F. and intimately blend them just prior to application to the porous surface.

As has been stated before, the filler or first coat may or may not be pigmented. The second top or finish coat may be pigmented in the usual way, preferably utilizing pigments which are preferably inert to acid and alkali. Ordinary techniques of suspending pigments into resinous vehicles, i. e., ball-milling, may be employed. Thus, clear as well as colored coatings may be applied to the cementitious or siliceous materials to produce highly decorative and useful building units.

The blocks after application of the plural coatings are then stored with the coated face in a horizontal position, preferably in a dust-free room where they are permitted to harden at normal room temperatures. The blocks may be handled after about 4 hours and obtain a hardness of 5 H to 7 H within 48–96 hours.

Best results are obtained when the temperature of the blocks is substantially equivalent to the temperature of the air at the time the coating is applied so that there is no tendency from this source for expansion or contraction of the air within the block during the application and setting periods for these coatings. If the temperature of the air within the block is warmer than the surrounding temperature, there will be a tendency for blistering, thereby adversely affecting the smoothness and appearance of the final article.

When both the filler coating and top finishing coating have hardened, there is obtained a porous cementitious or siliceous block having strongly adhering thereto a decorative substantially smooth surface coating. The adherence of the ether resins herein described to cementitious or siliceous materials is indeed remarkable since it has been found almost impossible to destroy the interface between the resin and the material being coated. When it is attempted to separate the film from the block, failure usually occurs in the cementitious or siliceous material and not at the interface. The coated surface is strongly resistant to alkali and acid because of the chemically inert nature of the ether type resin. Thus, the film is not destroyed by the basic characteristics of the base material nor is it affected by the application of dilute acid solutions, a practice normally followed by masons to remove mortar from the surface of the blocks.

The extreme hardness of these films renders the completed article admirably suited for interior as well as exterior finish wall surfaces and as a building material in schools, for example, these materials will withstand the abuse normally encountered in such structures. Flexibility is another important characteristic of these films and therefore the article is able to withstand sharp impact without marring, chipping or shattering, as is the case with glazed ceramic tile.

It is also possible to produce a finished surface article in which the surface has any range of gloss which is desired by altering the composition of the resinous component to affect the gloss. The higher concentration of hardening agent, the lower the gloss and, of course, if desired, flatting agents such as silica may be included in the formulation.

The cost of producing the articles of this invention is to some extent a function of the porosity of the material being coated, the more porous the material the more resin being required to acquire a build-up of the type necessary to provide a second coat thickness of from 2 to 70 mils. With the cinder block of the type known to the trade as "Hadite," it has been found possible to cover from 45 to 65 square feet per gallon of material applied. With the cement block type, exemplified by the block known to the trade as "Waylite," from 55 to 75 square feet may be coated with one gallon of the material. Limestone block, being a more compact material, shows a coverage of from 85 to 130 square feet per gallon of the coating composition. It will be appreciated, therefore, that the cost of coating each block is relatively low when compared with the cost of constructing a finish wall surface or employing glazed tile for that purpose. The articles of this invention are considered to be new building materials and although in certain respects comparable in effect to glazed ceramic tile, the properties are vastly different and accordingly the article must be handled and employed differently from the ordinary ceramic tile.

These articles are believed to be unique in that they combine the desirable features of a structural material, particularly in the case of blocks and bricks with a completely finished surface so that furring, plastering, veneering, and other such operations normally encountered with the use of such building materials are thereby avoided. The economic advantages of this are great indeed and a variety of decorative surfaces either of uniform color, mottled color or colorless surfacing may be produced without undue altering of the apparatus and means of producing the material.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of making a structural unit which comprises substantially filling the pores of a formed porous physically solid building block by working a viscous admixture of a polyglycidyl polyether of a polyhydric phenol and from about 1% to about 10% by weight of an organic polyamine based on the weight of said polyether having an inert filler material dispersed therein into the surface to yield a substantially smooth surface and then superimposing a second coating composition thereover, which composition also comprises a resinous admixture of a polyglycidyl polyether of a polyhydric phenol and from about 1% to about 10% by weight of an organic polyamine based on the weight of said polyether having dispersed therein a hiding pigment and allowing the plural coatings to harden.

2. The method of making a structural unit which comprises substantially filling the pores of at least one face of a formed porous physically solid building block by mechanically scraping and pounding a viscous filler admixture of a polyglycidyl polyether of a polyhydric phenol and from about 1% to about 10% by weight of an organic polyamine based on the weight of said polyether having dispersed therein an inert filler material into the pores of said face to yield a substantially smooth surface, and then superimposing a second coating composition thereover prior to hardening of said filler admixture, which second coating composition also comprises a viscous admixture of a polyglycidyl polyether of a polyhydric phenol and from about 1% to about 10% by weight of an organic polyamine based on the weight of said polyether having dispersed therein a hiding pigment, and allowing the plural coatings to harden.

3. The method of making a structural unit which comprises substantially filling the pores of at least one face of a formed porous physically solid building block by mechanically scraping and pounding a viscous filler admixture comprising on a weight basis from 6 parts to 60 parts of an organic polyamine, about 600 parts of resinous polyglycidyl polyether of di-(p-hydroxy phenyl) dimethyl methane, about 190 parts of an aromatic hydrocarbon solvent and about 380 parts of an inert filler, into the pores of said face to yield a substantially smooth surface, and then superimposing a second coating composition thereover prior to the hardening of said filler admixture, which second coating composition comprising on a weight basis a viscous admixture of from about 6 parts to about 60 parts of an organic polyamine, about 600 parts of resinous polyglycidyl polyether of di-(p-hydroxy phenyl) dimethyl methane, from about 125 parts to about 250 parts of titanium dioxide, from about 46 to about 90 parts of a colloidal clay and about 190 parts of an aromatic hydrocarbon solvent, and allowing the plural coatings to harden.

References Cited in the file of this patent

UNITED STATES PATENTS

| | | |
|---|---|---|
| 2,292,406 | Rothrock | Aug. 11, 1942 |
| 2,456,408 | Greenlee | Dec. 14, 1948 |
| 2,528,932 | Wiles | Nov. 7, 1950 |
| 2,657,153 | Russell | Oct. 27, 1953 |

OTHER REFERENCES

Shell Chemical Corp. Technical Bulletin S. C.: 52–39, published 1952. (Copy in Div. 60.)

Epon Surface Coating Resins (Shell Chemical Corp.), copyright 1950, 19 pages. (Copy available in Div. 50.)